US008412249B2

(12) United States Patent
Cheng et al.

(10) Patent No.: US 8,412,249 B2
(45) Date of Patent: Apr. 2, 2013

(54) RESOURCE ALLOCATION BASED ON INTERFERENCE MITIGATION IN A WIRELESS COMMUNICATION SYSTEM

(75) Inventors: Fang-Chen Cheng, Randolph, NJ (US); Shupeng Li, Edison, NJ (US); Lei Song, Edison, NJ (US)

(73) Assignee: Alcatel Lucent, Paris (FR)

( * ) Notice: Subject to any disclaimer, the term of this patent is extended or adjusted under 35 U.S.C. 154(b) by 774 days.

(21) Appl. No.: 11/313,258

(22) Filed: Dec. 20, 2005

(65) Prior Publication Data

US 2007/0142067 A1 Jun. 21, 2007

(51) Int. Cl.
*H04Q 7/20* (2006.01)
(52) U.S. Cl. ....... 455/512; 455/522; 455/501; 455/63.1; 455/67.11; 455/67.13
(58) Field of Classification Search .................. 455/501, 455/509, 507, 512, 522, 63.1, 67.11, 67.13
See application file for complete search history.

(56) References Cited

U.S. PATENT DOCUMENTS

| 5,839,056 | A  | * | 11/1998 | Hakkinen ........................ 455/69 |
|-----------|-----|---|---------|-----------------------------------------|
| 5,898,928 | A  | * | 4/1999  | Karlsson et al. ................. 455/450 |
| 5,903,819 | A  | * | 5/1999  | Romesburg ................... 455/63.1 |
| 5,991,337 | A  | * | 11/1999 | Giles .............................. 375/222 |
| 6,262,980 | B1 | * | 7/2001  | Leung et al. ................... 370/336 |
| 6,591,108 | B1 | * | 7/2003  | Herrig .......................... 455/452.1 |
| 6,865,393 | B1 | * | 3/2005  | Baum et al. ................... 455/452.2 |
| 6,944,460 | B2 | * | 9/2005  | Haartsen ...................... 455/452.2 |
| 6,957,070 | B2 | * | 10/2005 | Voyer .......................... 455/450 |
| 7,016,319 | B2 | * | 3/2006  | Baum et al. ................... 370/329 |
| 7,142,864 | B2 | * | 11/2006 | Laroia et al. .................. 455/450 |
| 7,339,950 | B2 | * | 3/2008  | Nielsen et al. ................ 370/468 |
| 7,457,588 | B2 | * | 11/2008 | Love et al. .................... 455/67.11 |
| 2002/0082036 | A1 | * | 6/2002 | Ida et al. ........................ 455/522 |
| 2002/0119782 | A1 | * | 8/2002 | Voyer ............................ 455/450 |
| 2002/0183086 | A1 | * | 12/2002 | Hellmark et al. ............. 455/522 |
| 2002/0193133 | A1 | * | 12/2002 | Shibutani ...................... 455/522 |
| 2003/0063606 | A1 | * | 4/2003 | Odenwalder et al. ......... 370/389 |
| 2003/0125040 | A1 | * | 7/2003 | Walton et al. ................. 455/454 |
| 2003/0199252 | A1 | * | 10/2003 | Tiedemann et al. ........... 455/69 |
| 2003/0228865 | A1 | * | 12/2003 | Terry ........................ 455/422.1 |

(Continued)

FOREIGN PATENT DOCUMENTS
EP 1453337 A1 * 9/2004

OTHER PUBLICATIONS

R1-050835, "Downlink resource allocation," LG Electronics, 3GPP TSG RAN WG1#42, London, United Kingdom Aug. 29, 2005-Sep. 2, 2005.

(Continued)

*Primary Examiner* — Nay A Maung
*Assistant Examiner* — Erica Fleming-Hall
(74) *Attorney, Agent, or Firm* — Williams, Morgan & Amerson, P.C.

(57) ABSTRACT

The present invention provides a method involving at least one base station and at least one mobile unit. The method includes determining, based on an interference mitigation pattern, a plurality of transmission powers associated with a corresponding plurality of subcarriers available to said at least one base station. The method also includes determining a plurality of priority metrics associated with the plurality of subcarriers and the at least one mobile unit, and assigning at least one of the plurality of subcarriers to the at least one mobile unit based on the plurality of priority metrics and the interference mitigation pattern.

18 Claims, 5 Drawing Sheets

U.S. PATENT DOCUMENTS

| | | | |
|---|---|---|---|
| 2004/0190482 A1* | 9/2004 | Baum et al. | 370/347 |
| 2004/0192325 A1* | 9/2004 | Backes et al. | 455/453 |
| 2004/0192360 A1* | 9/2004 | Tsai et al. | 455/501 |
| 2004/0258036 A1* | 12/2004 | Fisher | 370/345 |
| 2005/0075125 A1* | 4/2005 | Bada et al. | 455/525 |
| 2005/0180350 A1* | 8/2005 | Kolor et al. | 370/320 |
| 2005/0250540 A1* | 11/2005 | Ishii et al. | 455/561 |
| 2005/0286547 A1* | 12/2005 | Baum et al. | 370/437 |
| 2006/0009210 A1* | 1/2006 | Rinne et al. | 455/423 |
| 2006/0014554 A1* | 1/2006 | Gerlach | 455/501 |
| 2006/0073789 A1* | 4/2006 | Horisaki | 455/59 |
| 2006/0083161 A1* | 4/2006 | Laroia et al. | 370/208 |
| 2006/0126749 A1* | 6/2006 | Armour et al. | 375/260 |
| 2006/0154684 A1* | 7/2006 | Meiyappan | 455/522 |
| 2006/0246938 A1* | 11/2006 | Hulkkonen et al. | 455/522 |
| 2006/0252436 A1* | 11/2006 | Tirkkonen et al. | 455/501 |
| 2007/0042784 A1* | 2/2007 | Anderson | 455/450 |
| 2007/0047569 A1* | 3/2007 | Das et al. | 370/443 |
| 2007/0060187 A1* | 3/2007 | Englund et al. | 455/522 |
| 2007/0111746 A1* | 5/2007 | Anderson | 455/522 |
| 2007/0140102 A1* | 6/2007 | Oh et al. | 370/208 |
| 2007/0173276 A1* | 7/2007 | Love et al. | 455/522 |
| 2007/0217362 A1* | 9/2007 | Kashima et al. | 370/330 |
| 2008/0076466 A1* | 3/2008 | Larsson | 455/522 |
| 2009/0143070 A1* | 6/2009 | Shu et al. | 455/450 |

OTHER PUBLICATIONS

R1-051042, "System level performance comparison between frequency-scheduled and time-frequency diversity transmission," Samsung, 3GPP TSG RAN WG1 Meeting #42bis, San Diego, Ca., USA, Oct. 10-14, 2005.

R1-051064, "Resource block bandwidth for OFDMA-based EUTRA downlink in localized mode," Panasonic, 3GPP TSG-RAN WG1 Meeting @42bis, San Diego, CA., USA, Oct. 10-14, 2005.

R1-050594, 'Interference Coordination for Evolved UTRA Uplink Access', Alcatel, 3GPP TSG RAN WG1 LTE Ad Hoc on LTE, Sophia Antipolis, France, Jun. 20-21, 2005.

'Interference Mitigation—Considerations and Results on Frequency Reuse', Siemens, TSG-RAN WG1 Ad Hoc on LTE, Sophia Antipolis, France, Jun. 20-21, 2005.

R1-050629, 'Inter-cell interference mitigation', Huawei, 3GPP TSG RAN WG1 Ad Hoc on LTE, Sophia Antipolis, France, Jun. 20-21, 2005.

* cited by examiner

Figure 4A (400)

|   | A | B | C | D | E | F | G |
|---|---|---|---|---|---|---|---|
| 1 | 10 | 7 | 1 | 4 | 9 | 6 | 9 |
| 2 | 2 | 8 | 3 | 7 | 6 | 4 | 1 |
| 3 | 1 | 1 | 3 | 6 | 4 | 2 | 5 |
| 4 | 5 | 1 | 10 | 2 | 3 | 2 | 2 |
| 5 | 4 | 2 | 6 | 8 | 1 | 7 | 8 |

Figure 4B (405)

|   | A | B | C | D | E | F | G |
|---|---|---|---|---|---|---|---|
| 1 | 0 | 0 | 0 | 0 | 0 | 0 | 0 |
| 2 | 0 | 8 | 3 | 7 | 6 | 4 | 1 |
| 3 | 0 | 1 | 3 | 6 | 4 | 2 | 5 |
| 4 | 0 | 1 | 10 | 2 | 3 | 2 | 2 |
| 5 | 0 | 2 | 6 | 8 | 1 | 7 | 8 |

Figure 4C (410)

|   | A | B | C | D | E | F | G |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 10 | 2 | 3 | 2 | 2 |
| 5 | 0 | 0 | 6 | 8 | 1 | 7 | 8 |

Figure 4D (415)

|   | A | B | C | D | E | F | G |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 2 | 3 | 2 | 2 |
| 5 | 0 | 0 | 0 | 8 | 1 | 7 | 8 |

RESOURCE ALLOCATION BASED ON INTERFERENCE MITIGATION IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as node-Bs, for providing wireless connectivity to one or more mobile units, which may also be referred to using terms such as user equipment, subscriber equipment, and access terminals. Exemplary mobile units include cellular telephones, personal data assistants, smart phones, text messaging devices, laptop computers, desktop computers, and the like. Each base station may provide wireless connectivity to one or more mobile units in a geographical area, or cell, associated with the base station. For example, a base station that operates according to a Universal Mobile Telecommunication System (UMTS) protocol may provide wireless connectivity to one or more mobile units in a cell associated with the base station over a wireless communication link.

One technique that permits each base station to transmit concurrently to multiple mobile units is orthogonal frequency-division multiplexing (OFDM). In OFDM, a single transmitter (e.g., a base station) may transmit signals on many different orthogonal frequencies, which may also be referred to as sub-carriers or tones. For example, an OFDM carrier signal may include dozens to thousands of orthogonal sub-carriers. The baseband data carried over each sub-carrier may be independently modulated, e.g., using quadrature amplitude modulation (QAM), phase-shift keying (PSK), or some other modulation scheme. For example, the modulation scheme for a given sub-carrier may be determined based on channel quality information associated with the sub-carrier. The composite baseband signal is typically used to modulate a main radiofrequency carrier wave. Each mobile unit may receive information from the base station via one or more sub-carriers.

Downlink radio resources in both the temporal domain and the frequency domain may be controlled by a scheduler in the base station. Conventional scheduling algorithms associate a priority with each mobile unit to indicate the order in which the scheduling algorithm should consider assigning one or more subcarriers to the mobile unit. Resources may then be allocated to the mobile units in the order indicated by the priority. Resource allocation typically includes determining powers and/or bandwidth to optimize performance within the cell served by the base station. For example, the power allocated to each subcarrier may be determined using a "water filling" algorithm. In the water filling algorithm, the channel gain associated with each subcarrier is inverted to form a series of "peaks" and "valleys" in a graphical representation of the inverted channel gain. A water level is selected for the graphical representation so that the difference between the inverted channel gain of each channel and the water level is proportional to the power allocated to the channel, subject to the constraint that the sum of the allocated powers is less than or equal to the total available transmission power.

Interference mitigation schemes may also be implemented to reduce interference between the cell served by the base station and adjacent cells. For example, base stations in adjacent cells may transmit using the same set of frequency channels. If both base stations allocate the same frequency channel to different mobile units, then the mobile units may receive a composite signal including signals from both base stations on the assigned frequency channel. One portion of the composite signal is the desired signal and another portion of the composite signal will be seen as interference, which is conventionally referred to as "co-channel interference." Co-channel interference may interfere with, and potentially disrupt, communication with the mobile units. Thus, interference mitigation schemes typically attempt to minimize co-channel interference by coordinating assignment of the radio channels, and the power assigned to each channel, among base stations that serve adjacent cells. For example, mobile units near the edge of a cell are typically assigned to a subset of the frequency channels that may transmit at a higher power. Conventional interference mitigation schemes attempt to reduce co-channel interference caused by these higher power transmissions by coordinating frequency channel assignment so that base stations serving adjacent cells use different subsets of the frequency channels for the higher power transmissions.

However, conventional resource allocation schemes such as the water filling algorithm described above generally operate independently of interference mitigation schemes. Consequently, the conventional resource allocation schemes may not optimally allocate resources. To the contrary, in some cases the resource allocation schemes and the interference mitigation schemes may attempt to allocate resources in a contradictory manner. For example, the water filling algorithm typically allocates more power to channels that have a low channel gain, i.e., channels that have the best channel quality. However, channels that are used to transmit to mobile units near the edge of a cell typically have a relatively low channel quality and a correspondingly high channel loss. Accordingly, conventional interference mitigation schemes may attempt to assign a relatively high power level to mobile units in the protected regions, whereas the conventional resource allocation scheme may attempt to assign a relatively low power level to the same mobile units.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided involving at least one base station and at least one mobile unit. The method includes determining, based on an interference mitigation pattern, a plurality of transmission powers associated with a corresponding plurality of subcarriers available to said at least one base station. The method also includes determining a plurality of priority metrics associated with the plurality of subcarriers and the at least one mobile unit, and assigning at least one of the plurality of subcarriers to the at least one mobile unit based on the plurality of priority metrics and the interference mitigation pattern.

BRIEF DESCRIPTION OF THE DRAWINGS

The invention may be understood by reference to the following description taken in conjunction with the accompanying drawings, in which like reference numerals identify like elements, and in which:

FIGS. 4A, 4B, 4C, and 4D conceptually illustrate four exemplary embodiments of a merit table, in accordance with the present invention.

Figure 1:
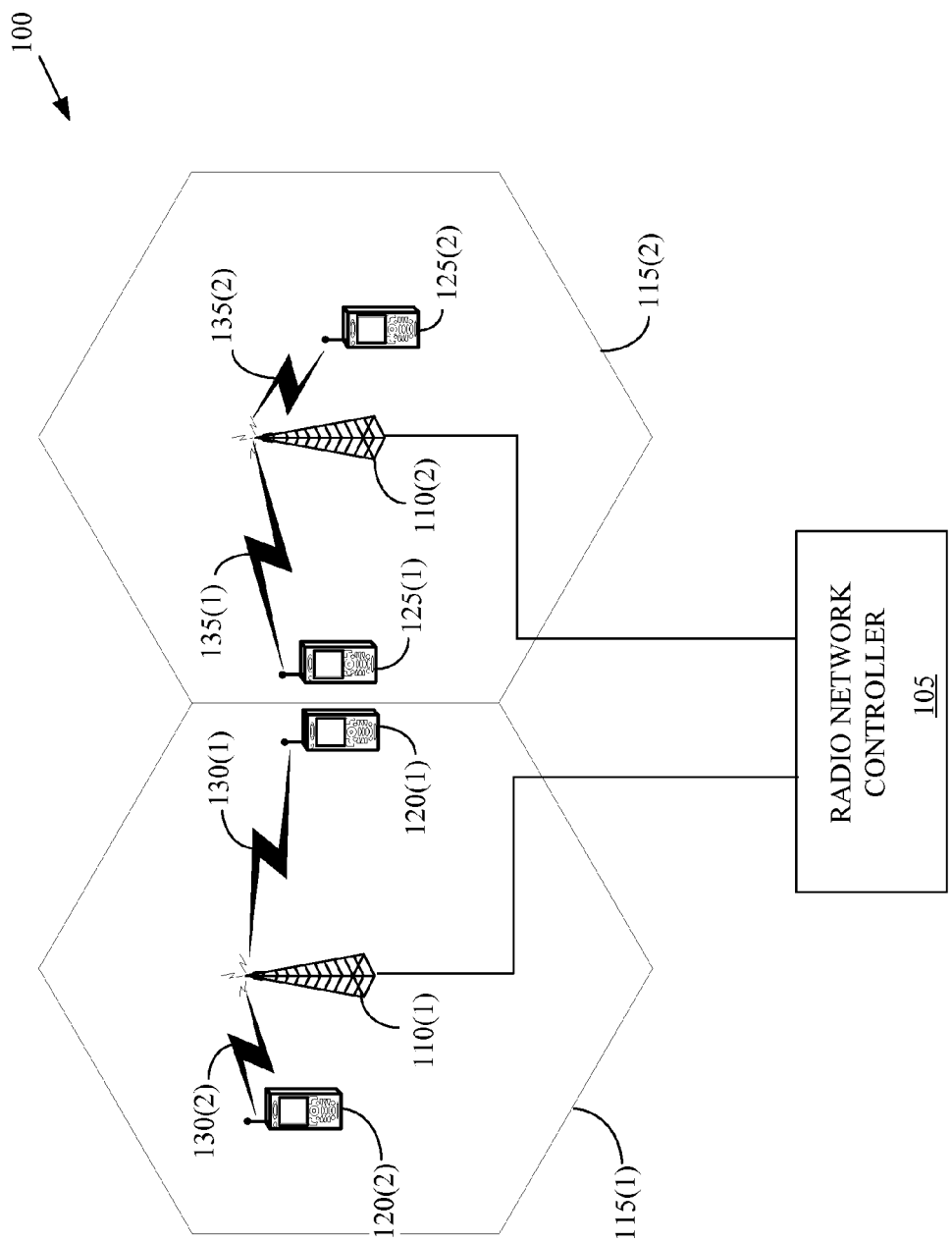
FIG. 1 conceptually illustrates one exemplary embodiment of a communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 is a wireless communication system including a radio network controller 105. The communication system 100 and the radio network controller 105 may operate according to Universal Mobile Telecommunication Services (UMTS) protocols and may implement Orthogonal Frequency Division Multiple Access (OFDMA). However, persons of ordinary skill in the art having benefit of the present disclosure should appreciate that the present invention is not limited to communication systems that operate according to UMTS and/or OFDMA. In alternative embodiments, the communication system 100 may operate according to one or more other protocols including, but not limited to, the Global System for Mobile communication (GSM), Code Division Multiple Access (CDMA, CDMA 2000), and the like. Furthermore, in some embodiments, one or more channel codes may be used in conjunction with OFDMA.

The radio network controller 105 is communicatively coupled to base stations 110(1-2). The indices (1-2) will be used hereinafter to refer to individual base stations and/or subsets of base stations. However, in the interest of clarity, the indices (1-2) may be dropped when the base stations 110 are referred to collectively. This convention will also be applied hereinafter to other elements that are referred to using a single reference number and one or more indices. The base stations 110 may provide wireless connectivity to corresponding geographical areas or cells 115. As discussed above, the base stations 110 may provide wireless connectivity according to UMTS protocols and may implement OFDMA, but the base stations 110 are not limited to these protocols. In the illustrated embodiment, the base station 110(1) provides wireless connectivity to the mobile units 120 and the base station 110(2) provides wireless connectivity to the mobile units 125. However, persons ordinary skill in the art having benefit of the present disclosure should appreciate that the base stations may provide wireless connectivity to any number of mobile units at any location within or proximate to the cells 115.

The base stations 110 may establish one or more wireless communication links 130, 135 with the mobile units 120, 125, respectively. In the illustrated embodiment, the wireless communication links 130, 135 include one or more subcarriers within a selected frequency band, e.g., the subcarriers may be defined according to an OFDMA scheme. Persons of ordinary skill in the art should appreciate that subcarriers may also be referred to using terms such as frequency channels, subchannels, tones, and the like. The base stations 110 may transmit information over the subcarriers at a selected transmission power. However, the base stations 110 in adjacent cells 115 may utilize the same set of subcarriers, which may lead to co-channel interference. Accordingly, transmission on the subcarriers may be scheduled in a manner that mitigates co-channel interference.

In the illustrated embodiment, the radio network controller 105 may determine an interference mitigation pattern, which may be provided to the base stations 110. As used herein, the term "interference mitigation pattern" refers to information, rules, and/or guidelines that may be implemented to attempt to reduce co-channel interference. Examples of information that may be included in an interference mitigation pattern include a frequency assignment order list associated with the subcarriers, power offsets between groups of subcarriers, and the like. Although the radio network controller 105 determines the interference mitigation pattern in the illustrated embodiment, persons of ordinary skill in the art having benefit of the present disclosure should appreciate that in alternative embodiments the interference mitigation pattern may be determined at any location in the communication system 100.

In one embodiment, the radio network controller 105 may determine one or more transmission powers for the subcarriers associated with the base stations 110 based on the interference mitigation pattern. For example, the subcarriers associated with each of the base stations 110 may be partitioned into two or more sets having different transmission powers that are separated by a power offset indicated by the interference mitigation pattern. The transmission power sets may include a low-power level set and a high power level set, and the difference between the low-power level and the high power level may be given by the power offset. The radio network controller 105 may provide this information to the base stations 110, e.g., the radio network controller 105 may provide lists of the indices of the subcarriers that are assigned to the low-power set and/or the high-power set.

Figure 2:
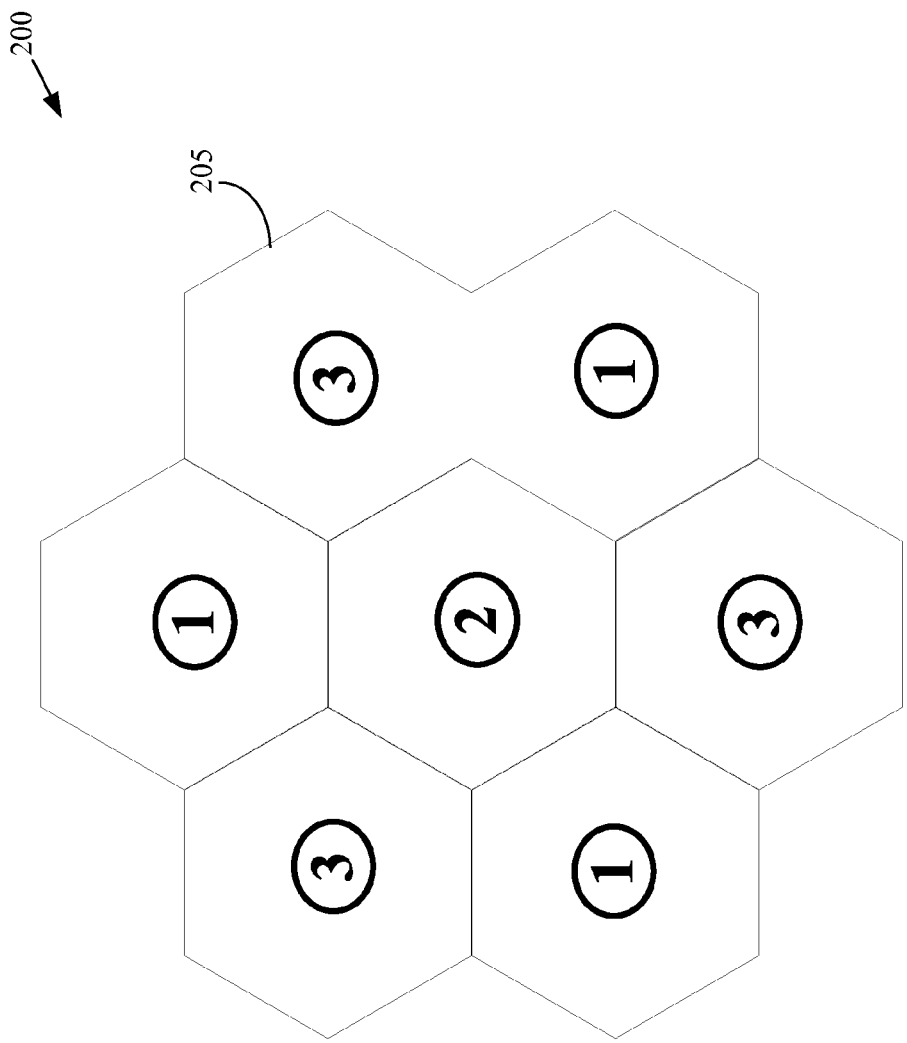
FIG. 2 conceptually illustrates one exemplary embodiment of a wireless communication system, in accordance with the present invention.

FIG. 2 conceptually illustrates one exemplary embodiment of a wireless communication system 200 in which the subcarriers have been partitioned into low-power sets and high-power sets. In the illustrated embodiment, three different subsets of the subcarriers associated with base stations in the cells 205 (only one indicated in FIG. 2) may be partitioned into low or high power sets. For example, if each base station may transmit over nine subcarriers, then the high-power sets may include either subcarriers 1-3, subcarriers 4-6, or subcarriers 7-9. However, persons of ordinary skill in the art should appreciate that the present invention is not limited to base stations transmitting using nine subcarriers. In alternative embodiments, base stations may transmit using any number of subcarriers, which may be subdivided into any number of high-power sets.

Figure 5:
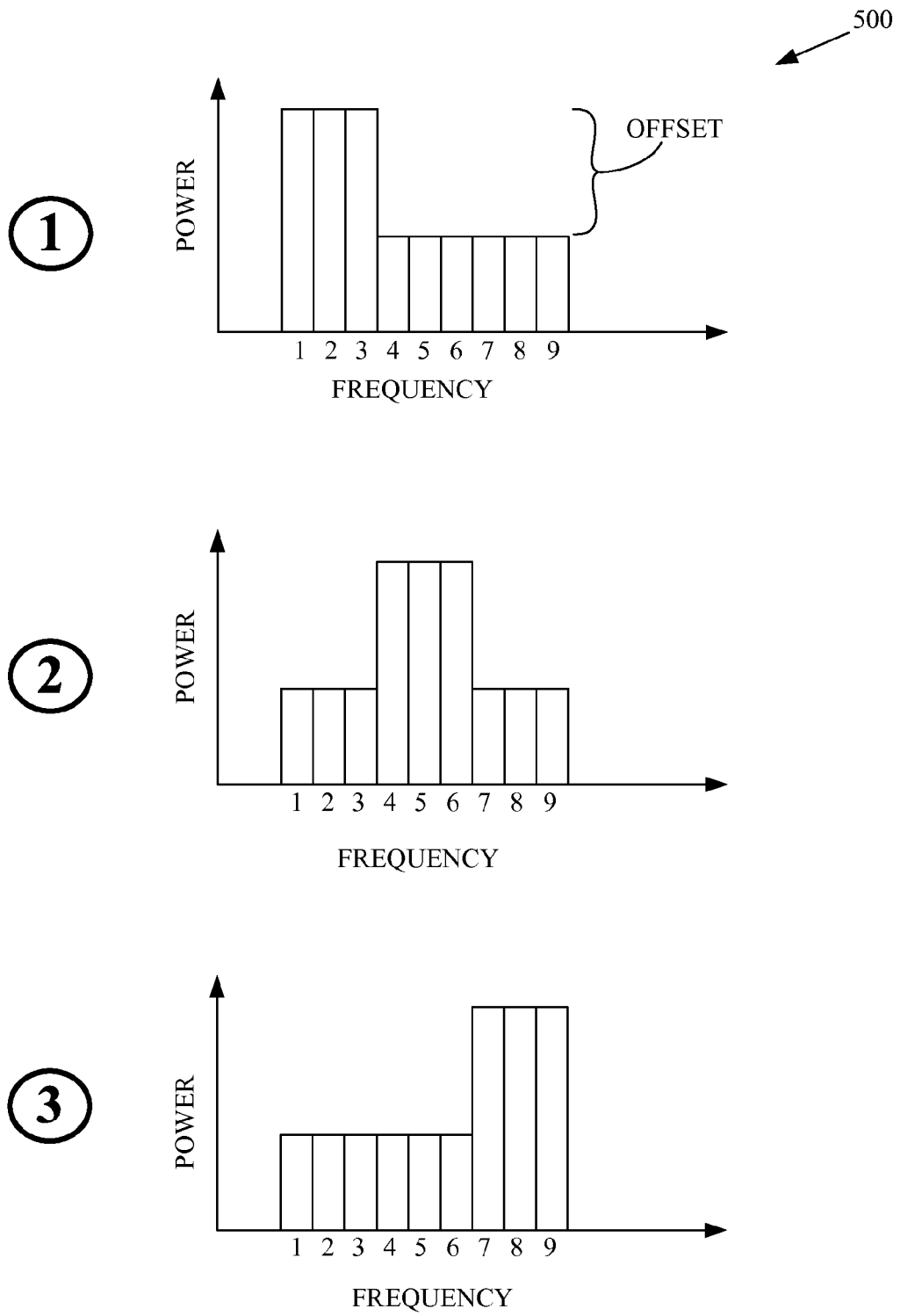
FIG. 5 conceptually illustrates one exemplary embodiment of a subcarrier partition into low-power sets and high power sets.

The high-power sets may be assigned to each base station so that base stations serving adjacent cells do not have the same set of subcarriers assigned to the high-power set. For example, as illustrated in the embodiment 500 shown in FIG. 5, the base stations having the subcarriers 1-3 in the high-power set are indicated using the encircled-1, the base stations having the subcarriers 4-6 in the high-power set are indicated using the encircled-2, and the base stations having the subcarriers 7-9 in the high-power set are indicated using the encircled-3. One exemplary arrangement of the base stations in which no adjacent base station utilizes the same set of subcarriers in the high-power set is shown in FIG. 2. However, persons of ordinary skill in the art should appreciate that any arrangement may be used. Moreover, persons of ordinary skill in the art should also appreciate that the illustrated embodiment uses idealized hexagonal cells 205 and in actual implementations the cells 205 may have irregular shapes. Consequently, the subcarriers may be partitioned into additional subsets so that adjacent cells may not include the same subcarriers in the high-power set.

Referring back to FIG. 1, the radio network controller 105 may also determine a frequency assignment order list. In one embodiment, the radio network controller 105 determines a frequency assignment order list to mitigate interference between adjacent cells. For example, the frequency assignment order list may indicate that the base station 110(1) should assign subcarriers having odd subcarrier indices before assigning subcarriers having even subcarrier indices. The frequency assignment order list may also indicate that the base station 110(2) should assign subcarriers having even subcarrier indices before assigning subcarriers having odd subcarrier indices. Accordingly, the potential for co-channel interference may be mitigated by the frequency assignment order list because the adjacent base stations may not be assigning the same subcarriers concurrently. However, persons of ordinary skill in the art having benefit of the present disclosure should appreciate that this is only one example of a frequency assignment order list and in alternative embodiments any frequency assignment order list may be used.

The base stations 110 may schedule one or more of the subcarriers using the information indicative of the interference mitigation pattern provided by the radio network controller 105. In one embodiment, each base station 110 may calculate a transmit merit (also referred to hereinafter as a priority metric) for each potential combination of subcarriers and mobile units 120, 125 based on the pre-determined transmit power. The base stations 110 may then evaluate each of the subcarriers for possible assignment or allocation to one of the mobile units 120, 125 according to the frequency assignment order list. For example, a scheduler (not shown) in the base station 110(1) may choose the mobile unit 120(2) on this subcarrier that has the highest transmit merit or priority metric. The scheduler may then derive a modulation and coding scheme for the subcarrier, e.g., based on channel quality information (CQI) and/or transmission power for this subcarrier and mobile unit 120(1). For example, the base station 110(1) may derive an expected signal-to-noise ratio (SNR) using the power and CQI and then find the modulation and coding scheme using a lookup table that indicates the appropriate modulation and coding scheme for the determined SNR.

Once the modulation scheme is chosen, the base stations 110(1) may derive the number of subcarriers needed to transmit a packet to the associated mobile unit 120(1). For example, the base station 110(1) may assume the same modulation and coding scheme for additional subcarriers that have not been assigned to other mobile units 120, 125. If there are not enough subcarriers available to transmit the packet, the mobile unit 120(1) may be skipped by this allocation. The mobile unit 120(1) may then be masked, e.g., by masking the mobile unit 120(1) metrics in the merit table to the lowest priority metric for all subcarriers. The allocation process for the scheduling interval may end if all mobile units 120, 125 have been allocated or all subcarriers have been assigned or all entries of the merit table have been masked off.

Figure 3:
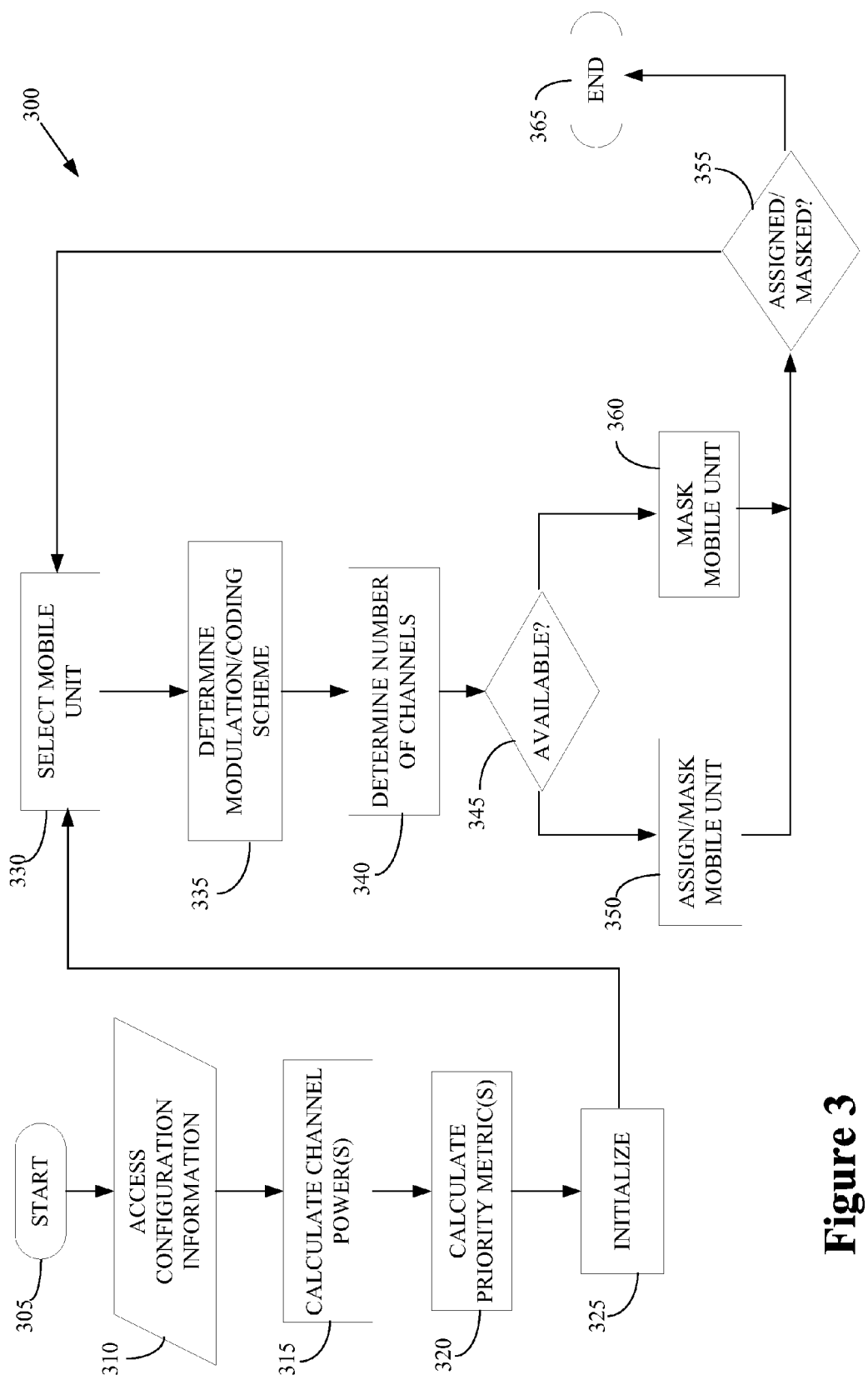
FIG. 3 conceptually illustrates one exemplary embodiment of a method of scheduling subcarriers based on an interference mitigation pattern, in accordance with the present invention.

FIG. 3 conceptually illustrates one exemplary embodiment of a method 300 of scheduling subcarriers based on an interference mitigation pattern. In the illustrated embodiment, the method 300 starts (at 305) and configuration information is accessed (at 310). The configuration information may include data associated with one or more mobile units, such as current channel quality information (CQI), one or more delays, buffer lengths, and the like. The configuration information may also include system configuration information such as an available bandwidth for transmission, subcarriers that are available and/or in use, the interference mitigation pattern, total power available for transmission, and the like. As discussed above, the interference mitigation pattern may include a frequency assignment order list, a power offset, and other information. In one embodiment, the base station may access (at 310) the configuration data from one or more memory elements and/or registers in the base station, one or more mobile units, a radio network controller, or from other locations. Alternatively, accessing (at 310) the configuration data may include determining portions of the configuration data based on other measurements, such as measurements made using one or more pilot signals.

Transmission powers for each of the frequency channels (or subcarriers) may then be calculated (at 315) based on the configuration information. In one embodiment, the configuration information may include the total power available for transmission and a power offset between a high-power set of subcarriers and a low-power set of subcarriers. The transmission powers may then be calculated (at 315) using conventional techniques. For example, a water filling algorithm may be used to allocate the transmission powers to the frequency channels.

Transmit merits and/or priority metrics associated with each sub-carrier or a group of sub-carriers may then be calculated (at 320) using the configuration information. In one embodiment, the priority metrics may be calculated (at 320) using information associated with one or more mobile units such as channel quality information (CQI), delays, buffer lengths, transmit status, and the like. For example, one or more weights may be associated with portions of the configuration information associated with the mobile unit and the priority metrics may then be calculated using the weights. One possible formula for computing the priority metrics, PM, is: $PM=w1*CQI+w2*delay+w3*(buffer\ length)+w4*(transmit\ status)$, where the weights are given by $w1, w2, w3$, and $w4$. Persons of ordinary skill in the art should appreciate that the units of the variables in the preceding formula may be chosen in any appropriate manner. Furthermore, persons of ordinary skill in the art should also appreciate that other formulae, which may include more or fewer variables and/or weights, may be used to calculate (at 320) the priority metrics. A merit table may then be initialized (at 325) using the determined priority metrics, as well as the frequency assignment order list.

FIGS. 4A, 4B, 4C, and 4D conceptually illustrate four exemplary embodiments of a merit table 400, 405, 410, 415.

FIG. 4A illustrates the merit table 400 following initialization using the priority metrics. The vertical axis indicates the subcarrier index, which ranges from 1 to 5 in the illustrated embodiment. As discussed above, the subcarrier indices the illustrated embodiment reflect the order of subcarriers indicated in a frequency assignment order list. The horizontal axis in FIG. 4A indicates the mobile units that may be potentially assigned to the subcarriers. The mobile units are referred to using the letters A-G in the illustrated embodiment. Each entry in the merit table 400 includes a priority metric associated with the corresponding subcarrier and mobile unit. Units for the priority metrics are arbitrary. Persons of ordinary skill in the art should appreciate that the merit table 400 is intended to be illustrative and not to limit the present invention. In particular, the present invention is not limited to any particular representation of the merit table 400, the subcarrier indices, the mobile unit identifiers, or the priority metrics. The present invention is also not limited to any particular number of subcarriers and/or mobile units.

Referring back to FIG. 3, one of the mobile units is selected (at 330) for potential assignment to a subcarrier. In one embodiment, the frequency assignment order list may be used to determine the first subcarrier that should be assigned or allocated. The mobile unit having the highest priority metric for the first subcarrier may then be selected (at 330) for potential assignment to the first subcarrier. A modulation and coding scheme may then be determined (at 335) for the first subcarrier and the selected mobile unit. For example, the modulation and coding scheme can be determined (at 335) based on channel quality information (which may reflect a signal-to-noise ratio) associated with the mobile unit and/or the subcarrier. A number of subcarriers needed to transmit information to the mobile unit may then be determined (at 340). For example, a buffer length (or packet size) in the mobile unit may be examined and used to determine (at 340) the number of subcarriers for the selected modulation and coding scheme. If the number of subcarriers is determined (at 345) to be available in the subcarriers may be assigned (at 350) to the mobile unit and the entries associated with this mobile unit and subcarrier in the merit table may be masked (at 350).

FIG. 4B depicts the merit table 405 following the assignment of the mobile unit A to the subcarrier 1. In the illustrated embodiment, the mobile unit A has the largest value of the priority metric (10) associated with the subcarrier 1. The number of subcarriers needed to transmit information in the buffer and/or packets associated with the mobile unit A was determined to be one and therefore only the subcarrier 1 was allocated to the mobile unit A. In the illustrated embodiment, the portions of the merit table 405 associated with the mobile unit A and the subcarrier 1 have been masked by setting the value of the priority metric in these entries to a low value, which in this case is 0.

Referring back to FIG. 3, if it is determined (at 355) that not all of the entries in the merit table have been assigned and/or masked, the method may then proceed to select (at 330) another mobile unit for potential assignment to one or more subcarriers and determine whether or not one or more subcarriers should be allocated to the mobile unit.

FIG. 4C depicts the merit table 410 following the assignment of the mobile unit B to the subcarriers 2 and 3. In the illustrated embodiment, the mobile unit B has the largest remaining value of the priority metric (8) associated with the the next subcarrier indicated by the frequency assignment order list, e.g., subcarrier 2. The number of subcarriers needed to transmit information in the buffer and/or packets associated with the mobile unit B was determined to be two and therefore subcarriers 2 and 3 were allocated to the mobile unit B. In the illustrated embodiment, the portions of the merit table 410 associated with the mobile unit B and the subcarriers 2 and 3 have been masked by setting the value of the priority metric in these entries to a low value, which in this case is 0.

Referring back to FIG. 3, if it is determined (at 345) that the number of subcarriers required to transmit the information associated with a mobile unit is larger than the available number of subcarriers, then the mobile unit may not be assigned to any subcarriers. The entries in the merit table associated with the mobile unit may then be masked (at 360).

FIG. 4D depicts the merit table 415 following the masking of the mobile unit C. In the illustrated embodiment, the mobile unit C has the largest remaining value of the priority metric (10) associated with the next subcarrier indicated by the frequency assignment order list, e.g., subcarrier 4. The number of subcarriers needed to transmit information in the buffer and/or packets associated with the mobile unit C was determined to be larger than two, i.e., larger than the remaining number of subcarriers, and therefore no subcarriers were allocated to the mobile unit C. In the illustrated embodiment, the portions of the merit table 415 associated with the mobile unit C have been masked by setting the value of the priority metric in these entries to a low value, which in this case is 0.

Referring back to FIG. 3, if it is determined (at 355) that all of the entries in the merit table have been assigned and/or masked, the method may then end (at 365).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    determining, based on an interference mitigation pattern, a plurality of downlink transmission powers associated with a corresponding plurality of subcarriers available to a base station, wherein the interference mitigation pattern determines power level sets used by each base station to transmit over the downlink so that each base station can concurrently transmit over a first portion of the subcarriers in a low power level set and over a second portion of the subcarriers in a high power level set subject to the constraint that base stations serving adjacent cells do not transmit on the same subcarrier using a downlink transmission power in the high power level set;
    determining, based on the plurality of downlink transmission powers, a plurality of priority metrics indicating priorities for allocating each of the plurality of subcarriers to said at least one mobile unit; and
    assigning at least one of the plurality of subcarriers to said at least one mobile unit based on the plurality of priority metrics, wherein assignment of the plurality of subcarriers proceeds in a predetermined assignment order that is determined based on the interference mitigation pattern.

2. The method of claim 1, wherein determining a plurality of downlink transmission powers comprises determining the plurality of downlink transmission powers based on a total transmission power available to the base station and a power offset between the low power level set and the high power level set.

3. The method of claim 1, wherein determining the plurality of priority metrics comprises determining the plurality of priority metrics based on the plurality of downlink transmission powers and a plurality of weights applied to the plurality of downlink transmission powers.

4. The method of claim 1, wherein determining the plurality of priority metrics comprises determining a plurality of priority metrics for a subset of frequency subcarriers based on at least one of a channel quality information associated with said at least one mobile unit, a delay associated with said at least one mobile unit, a buffer length of associated with said at least one mobile unit, and a transmit status associated with said at least one mobile unit.

5. The method of claim 1, wherein determining the plurality of priority metrics comprises determining a plurality of priority metrics for each possible combination of the plurality of subcarriers and said at least one mobile unit.

6. The method of claim 1, wherein assigning at least one of the plurality of subcarriers to at least one mobile unit comprises the next subcarrier in the predetermined assignment order to the mobile unit having the highest priority metric for the next subcarrier in the predetermined assignment order.

7. The method of claim 1, comprising selecting a modulation and coding scheme for said at least one subcarrier that is assigned to said at least one mobile unit based upon channel quality information associated with said at least one subcarrier that is assigned to said at least one mobile unit.

8. The method of claim 7, comprising:
    determining a number of the plurality of subcarriers needed to transmit a packet to said at least one mobile unit using the selected modulation and coding scheme; and
    allocating the determined number of the plurality of subcarriers to said at least one mobile unit in the predetermined assignment order.

9. The method of claim 7, wherein assigning said at least one of the plurality of subcarriers comprises determining a number of the plurality of subcarriers to be assigned based on at least one of a buffer length and the interference mitigation pattern, and comprising allocating the determined number of the plurality of subcarriers to said at least one mobile unit in the predetermined assignment order.

10. The method of claim 1, wherein determining the plurality of priority metrics comprises determining a plurality of priority metrics indicating priorities for allocating each of the plurality of subcarriers to each of a plurality of mobile units.

11. The method of claim 10, wherein assigning said at least one of the plurality of subcarriers comprises iteratively assigning at least one of the plurality of subcarriers to one of the plurality of mobile units, removing assigned subcarriers from a list of available subcarriers, removing said one of the plurality of mobile units from a list of mobile units awaiting assignment, and assigning at least one of the available subcarriers to one of the mobile units awaiting assignment based upon the priority metrics for the available subcarriers and the mobile units awaiting assignment.

12. A method, comprising:
    determining, based on an interference mitigation pattern, a plurality of downlink transmission powers to be used for concurrent transmission over a corresponding plurality of subcarriers available to a base station, wherein the downlink transmission powers are allocated to the subcarriers of different base stations so that adjacent base stations use different downlink transmission powers when concurrently transmitting on the same subcarrier;

constructing a merit table that pairs each of the plurality of subcarriers to each of a plurality of mobile units, wherein the merit table indicates an assignment order for the subcarriers, and wherein each merit table entry indicates a priority for assigning the mobile unit to the subcarrier indicated by the pair corresponding to the entry, and wherein the priorities are determined based upon the plurality of downlink transmission powers; and iteratively assigning subcarriers to mobile units in the assignment order based on the priorities indicated by the merit table until the plurality of subcarriers have been assigned to mobile units.

13. The method of claim 12, wherein iteratively assigning subcarriers to mobile units comprises selecting a number of subcarriers to assign to a mobile unit based on buffered information or packets to be transmitted to the mobile unit.

14. The method of claim 12, wherein iteratively assigning subcarriers to mobile units comprises assigning at least one subcarrier to a first mobile unit and then masking entries in the merit table corresponding to the first mobile unit and said at least one subcarrier.

15. The method of claim 14, wherein iteratively assigning subcarriers to mobile units comprises assigning at least one subcarrier corresponding to an unmasked entry in the merit table to a second mobile unit and then masking entries in the merit table corresponding to the second mobile unit and said at least one subcarrier assigned to the second mobile unit.

16. The method of claim 12, wherein constructing the merit table comprises determining a priority metric for the pairs of subcarriers and mobile units based on a weighted combination of channel quality information, delay information, a buffer length, and a transmit status associated with each pairing of a subcarrier and a mobile unit.

17. The method of claim 12, comprising determining the assignment order based on the interference mitigation pattern.

18. The method of claim 17, wherein determining the assignment order comprises determining the assignment order so that adjacent base stations are not concurrently transmitting on the same subcarriers.

* * * * *